United States Patent
Wynalda, Jr. et al.

(10) Patent No.: US 6,845,865 B2
(45) Date of Patent: Jan. 25, 2005

(54) DISPOSABLE MEDIA STORAGE CONTAINER

(76) Inventors: Robert Martin Wynalda, Jr., 420 9 Mile Rd., NE., Comstock Park, MI (US) 49321; Steven E. Hulbert, 5500 Kies St., Rockford, MI (US) 49341

( * ) Notice: Subject to any disclaimer, the term of this patent is extended or adjusted under 35 U.S.C. 154(b) by 0 days.

(21) Appl. No.: 10/323,118

(22) Filed: Dec. 18, 2002

(65) Prior Publication Data

US 2003/0111368 A1 Jun. 19, 2003

Related U.S. Application Data

(60) Provisional application No. 60/341,940, filed on Dec. 19, 2001.

(51) Int. Cl.[7] .............................................. B65D 85/57
(52) U.S. Cl. .................................... 206/308.1; 206/312
(58) Field of Search .............................. 206/308.1, 309, 206/312, 313; 229/307, 309, 310, 313

(56) References Cited

U.S. PATENT DOCUMENTS

| | | | |
|---|---|---|---|
| 2,931,557 A | * 4/1960 | Loderhouse | 206/15 |
| 3,522,907 A | * 8/1970 | Utterback, Jr. | 206/15 |
| 5,042,659 A | * 8/1991 | Morita | 206/387 |
| 5,188,229 A | 2/1993 | Bernstein | |
| 5,460,265 A | 10/1995 | Kiolbasa | |
| 5,518,488 A | * 5/1996 | Schluger | 493/82 |
| 5,685,424 A | * 11/1997 | Rozek et al. | 206/308.1 |
| 5,690,219 A | * 11/1997 | Harrer | 206/308.1 |
| 5,772,019 A | 6/1998 | Reed | |
| 6,092,653 A | * 7/2000 | Pozzoli | 206/312 |
| 6,126,201 A | * 10/2000 | Pace et al. | 281/29 |
| 6,298,985 B1 | * 10/2001 | Mathias | 206/308.1 |
| 6,375,003 B1 | * 4/2002 | Lethen et al. | 206/308.1 |
| 6,446,417 B1 | * 9/2002 | Lux, Jr. et al. | 53/462 |
| 6,457,581 B1 | * 10/2002 | Lesovoy | 206/308.1 |
| 6,505,739 B2 | * 1/2003 | Garnier | 206/312 |

\* cited by examiner

*Primary Examiner*—Shian T. Luong

(57) ABSTRACT

A disposable media storage container securely retains a disc within a storage chamber when the media storage container is closed. The container is opened by removing a door formed in a major panel of the container. The disc may be removed from the container through the opening that is defined when the door is removed. The container is then thrown away. The media storage container may be fabricated from a paper-based material.

18 Claims, 4 Drawing Sheets

DISPOSABLE MEDIA STORAGE CONTAINER

CROSS REFERENCE TO RELATED APPLICATIONS

This application claims priority from U.S. Provisional Patent application Ser. No. 60/341,940 filed Dec. 19, 2001; the disclosures of which are incorporated herein by reference.

BACKGROUND OF THE INVENTION

1. Technical Field

The present invention generally relates to media storage containers and, more particularly, to a media storage container that securely retains an item of recorded media until a portion of the container is destroyed. Specifically, the present invention relates to a disc storage container that securely retains a disc such as a CD or a DVD within the body of the container until a perforated door is permanently removed from one of the major panels of the container to allow the disc to be removed.

2. Background Information

Various media storage containers are known in the art. Known storage containers generally are either reusable containers or disposable containers. Disposable containers may be used to mail promotional discs to potential customers or to store discs inside of other containers. Disposable storage containers must be designed to securely retain the discs so that the discs do not freely move within the container so that the discs are not damaged. The containers must also allow the discs to be easily removed from the container while preventing the discs from falling out of the container when the container is initially opened. Although some existing media storage containers achieve these goals and have achieved success in the art, there remains room in the art for improvement.

SUMMARY OF THE INVENTION

The invention provides a disposable media storage container that securely retains a disc when the media storage container is closed. The container is opened by removing a door formed in a major panel of the container. In one embodiment of the invention, the door is defined by a perforated line of severance that allows the user to tear the door from the panel. In one embodiment of the invention, the door may be configured to prevent the disc from unintentionally falling out of the container while the door is being removed.

The invention also provides a media storage container that is fabricated from a paper-based material. In one embodiment, the container may be formed from at least two panels that are folded together and connected by a suitable connector. The panels define a disc storage chamber that securely receives the disc when the panels are folded into the closed position.

In another embodiment, the invention provides a disposable media storage container formed from four paperboard panels that fold over one another with the two middle panels cooperating to define a disc storage chamber. In this embodiment, the panels may also define a finger access hole that allows the user to lift the edge of the disc to remove it from the container. The disc may be removed from the container only after a door is removed from one of the two outer panels. The door is sized to prevent the disc from falling out of the door opening while the doors is removed.

BRIEF DESCRIPTION OF THE DRAWINGS

FIG. 5 is a perspective view showing the container in a closed condition with the item of recorded media securely held within the storage chamber.

Similar numbers refer to similar elements throughout the specification.

DETAILED DESCRIPTION OF THE PREFERRED EMBODIMENTS

Figure 1:
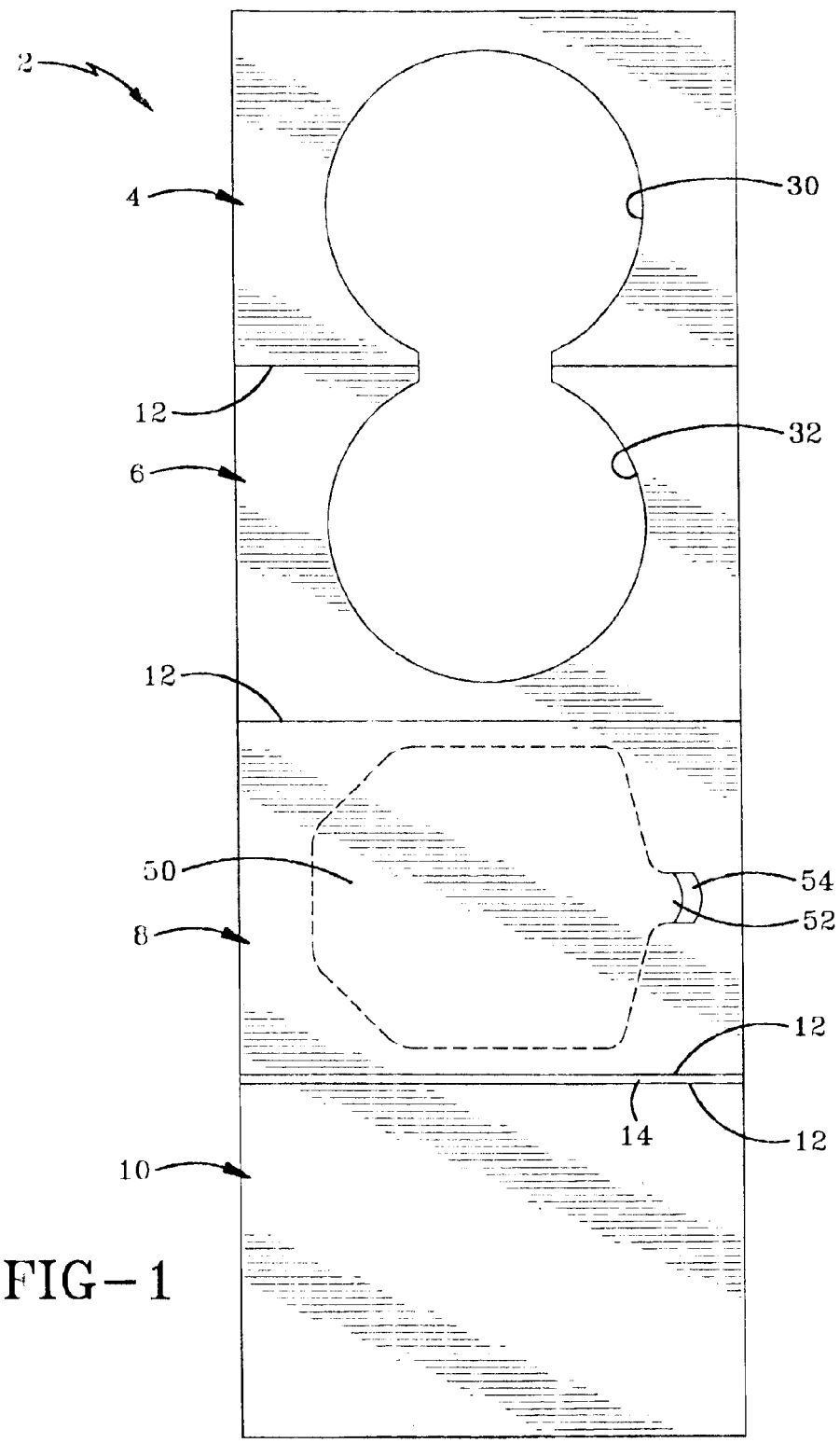
FIG. 1 is a top plan view of the media storage container of the present invention in an unfolded condition.
Figure 2:
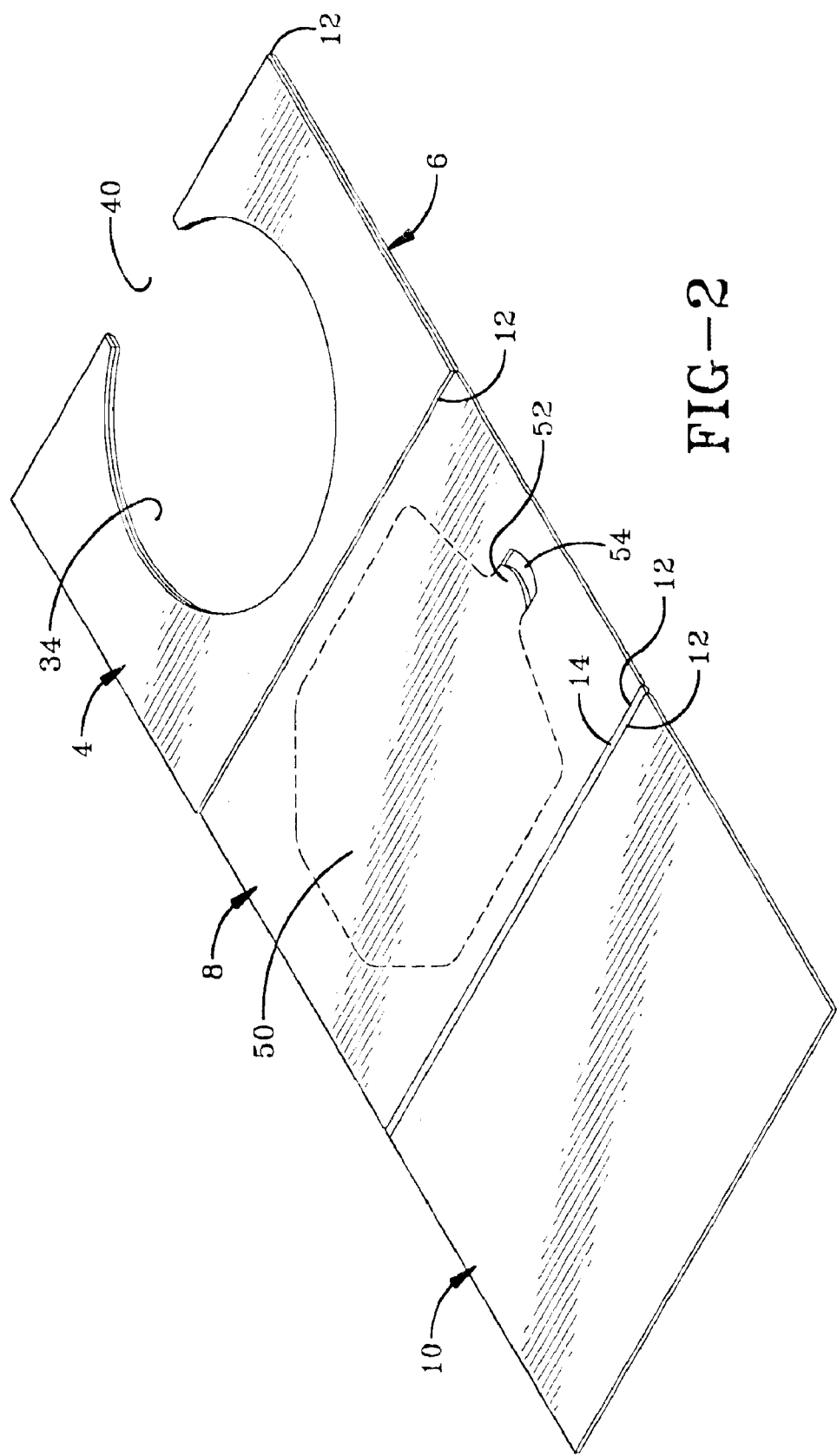
FIG. 2 is a perspective view showing the first two panels folded together to form a common storage chamber that is adapted to receive the item of recorded media.
Figure 3:
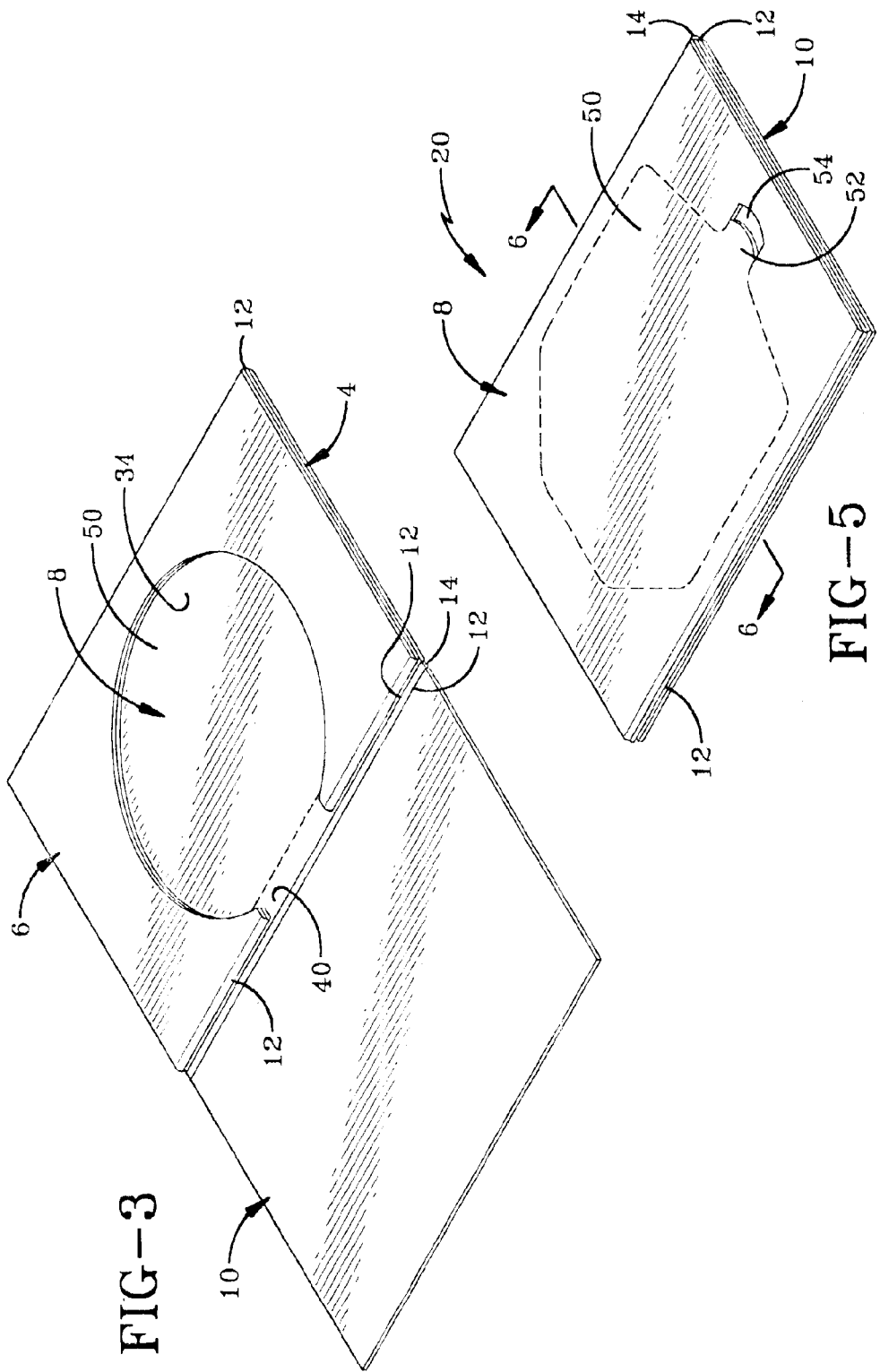
FIG. 3 is a view similar to FIG. 2 showing the first two panels folded over the third panel.
Figure 4:
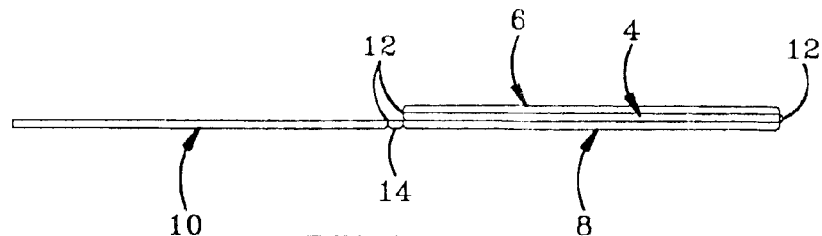
FIG. 4 is an end view of FIG. 3.

The media storage container of the present invention is formed from the blank 2 depicted in FIG. 1. In the exemplary embodiment of the invention, blank 2 defines first 4, second 6, third, 8, and fourth 10 major panels that are separated from one another by hinges 12. At least one of hinges 12 may be a double hinge having a hinge panel 14. Hinges 12 allow panels 4, 6, 8, and 10 to be folded into a storage container 20 adapted to securely hold an item of recorded media 22 such as a disc, a tape, or a memory card.

In the exemplary embodiment of the invention, blank 2 is formed from a paperboard material having a central portion and outer skin sheets. The outer skin sheets may be printed with advertising or informational materials. The central portion defines a major portion of the thickness of the paperboard and may be used to strengthen and stiffen the material. In this type of material, hinges 12 may be formed by scoring the outer skin and folding the material along the score line. The double hinge is formed with parallel score lines disposed on either side of hinge panel 14.

Figure 6:
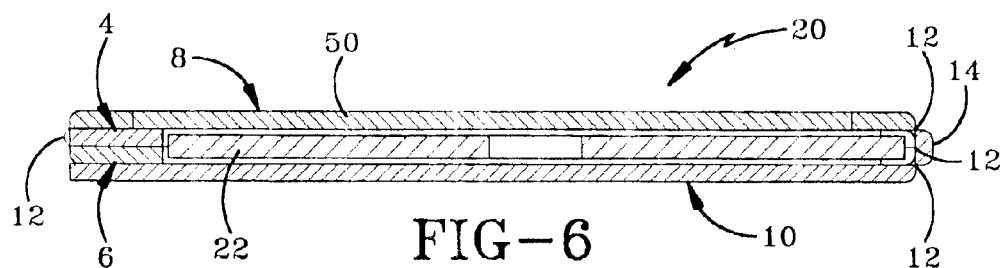
FIG. 6 is a section view taken along line 6—6 of FIG. 5.

First panel 4 defines an opening 30 sized to receive item of recorded media 22. When container 20 is designed to hold a disc such as a CD or a DVD, opening 30 has a diameter that is slightly larger than the diameter of disc so that the disc can only move small distances within opening 30. This prevents the disc from being damaged during mailing. Second panel 6 may also define an opening 32 that cooperates with opening 30 when first 4 and second 6 panels are folded together to form a common storage chamber 34. Two panels (4 and 6) are used to form storage chamber 34 when the thickness of one panel is less than the thickness of item 22. In the exemplary embodiment of the invention, the thickness of blank 2 is slightly larger than half of the thickness of item 22 such that the combined thickness of panels 4 and 6 is slightly larger than the thickness of item 22 (FIG. 6).

Figures 7, 8:
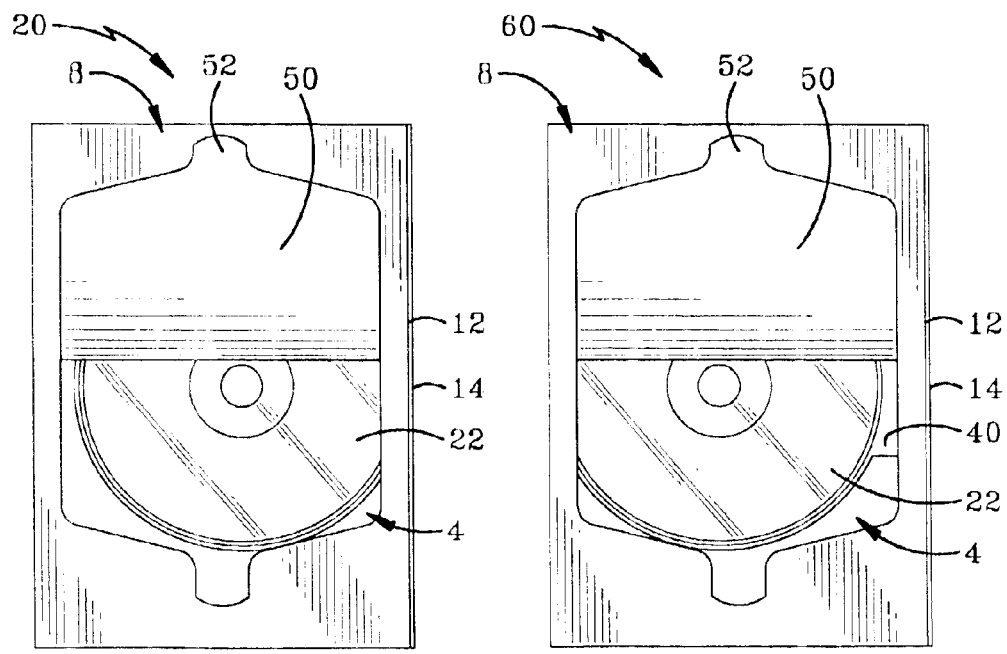
FIG. 7 is a top view of the media storage container with the door partially removed.
FIG. 8 is a top view of an alternative embodiment of the media storage container with the door partially removed.

A secondary opening 40 that joins openings 30 and 32 is used to define a finger access hole 42 that allows the user to lift the edge of item 22 when the user is removing item 22 from container 20 (FIG. 7). Secondary opening 40 extends across the hinge 12 that is defined between first panel 4 and second panel 6. In other embodiments of the invention, finger access hole 42 may be formed in other manners such as by changing the shape of openings 30 and 32 or by formed spaced secondary openings.

In the exemplary embodiment of the invention, first 4 and second 6 panels are held together by a suitable connector once they are folded over one another. The suitable connector may be an adhesive or a mechanical connector. Connectors preferable join the edges of panels 4 and 6 adjacent openings 30 and 32 so that item 22 may not slip between panels 4 and 6.

In the exemplary embodiment, first 4 and second 6 panels are middle or inner panels that are covered by a pair of outer panels that are formed by third 8 and fourth 10 panels. As such, container 20 may have four panel thicknesses that give container 20 rigidity and the ability to protect item 22. Second panel 6 may be slightly longer than first panel 4 so that hinge 12 between second panel 6 and third panel 8 is spaced from the edge of first panel 4 so that third panel 8 may easily fold back over the other side of first panel 4 without interference from the edge of first panel 4.

The double hinge is defined between third 8 and fourth 10 panels so that panels 8 and 10 may fold around first 4 and second 6 panels without stressing the material of blank 2 or excessively bending panels. Hinge panel 14 is thus positioned along one of the sides of container 20 and is substantially perpendicular to the major panels of container 20. The width of hinge panel 14 is thus substantially equal to the combined thickness of panels 4 and 6.

Panels 8 and 10 are held in the folded position by suitable connectors such as those described above. In the exemplary embodiment of the invention, third 8 and fourth 10 panels are connected to first 4 and second 6 panels with an adhesive. Panels 8 and 10 thus cover chamber 34 and form the front and rear walls that define chamber 34. One of panels 8 and 10 includes a door 50 that is aligned with a portion of chamber 34 so that chamber 34 may be accessed when door 50 is open.

In the exemplary embodiment of the invention, door 50 is connected to third panel 8. Door 50 is defined by a perforated perimeter line that allows door 50 to be torn away from third panel 8 when the user wishes to access chamber 34. Door 50 includes lifting tab 52 that allows the user to grasp and pull on door 50. Third panel 8 may define an opening 54 that allows the user to grasp tab 52 when door is closed. Opening 54 and the area where tab 52 was disposed before opening door 50 may also function as a finger access opening. Door 50 may have at least one wall that covers or overlies chamber 34 so that item 22 cannot fall directly our of chamber 34. Door 50 may be sized larger than chamber 34 as shown in FIGS. 7 and 8 so that a portion of panel 4 is exposed when door 50 is open.

Item 22 is thus completely sealed within chamber 34 of container 20 when door 50 is closed and panels 8 and 10 are closed. In this condition, container 20 may be shipped to the user without damaging item 22. The outwardly facing surface of fourth panel 10 may be printed with advertising material or information about the contents of item 22.

When the user desires to remove item 22 from container 20, the user removes door 50 by tearing door from the panel (FIG. 7). Item 22 may then be removed by the user by inserting a finger in finger access hole 42 and lifting the edge of item 22. Once item 22 is removed, container 20 may be discarded. In other embodiments of the invention, door 50 may be hinged to panel 8 so that door 50 may be closed and container 20 may be reused.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A media storage container for holding an item of recorded media, the media storage container comprising:
    a first outer panel and a second outer panel;
    the first outer panel having a first major surface end a second major surface;
    the second outer panel having a first major surface and a second major surface;
    the first major surface of the first outer panel facing the first major surface of the second outer panel;
    the first and second outer panels cooperating to define a storage chamber adapted to receive the item of recorded media;
    one of the first and second outer major panels defining a door integral to the panel; the door being movable from a closed position to an open position wherein the door is sized to allow an item of recorded media to be removed from the storage chamber when the door is in the open position;
    a first inner panel disposed between the first and second major outer panels; the first inner panel defining a portion of the storage chamber;
    a second inner panel adjacent to the first inner panel; the second inner panel defining a portion of the storage chamber; and
    the portions of the storage chamber defined by the first and second inner panels are connected together by a secondary opening.

2. The container of claim 1, wherein the first and second inner panels are connected together with a hinge.

3. The container of claim 2, wherein the secondary opening is divided by the hinge that connects the first and second inner panels.

4. The container of claim 3, wherein the door uncovers a portion of the secondary opening when the door is moved to the open position.

5. The container of claim 1, wherein the panels are fabricated from paperboard.

6. A media storage container for holding an item of recorded media, the media storage container comprising:
    a first outer panel and a second outer panel;
    the first outer panel having a first major surface and a second major surface;
    the second outer panel having a first major surface and a second major surface;
    the first major surface of the first outer panel facing the first major surface of the second outer panel,
    the first and second outer panels cooperating to define a storage chamber adapted to receive the item of recorded media;
    one of the first and second outer major panels defining a door integral to the panel; the door being movable from a closed position to an open position wherein the door is sized to allow an item of recorded media to be removed from the storage chamber when the door is in the open position;
    a first inner panel disposed between the first and second major outer panels; the first inner panel defining a portion of the storage chamber; and the storage chamber defined by the first inner panel being offset from the door causing a portion of the major outer panel that defines the door to cover a portion of the storage chamber when the door is in the open position.

7. The container of claim 6, wherein the door exposes a portion of the first inner panel when the door is in the open position.

8. The container of claim 6, wherein the panels are fabricated from paperboard.

9. A paperboard media storage container for holding an item of recorded media, the media storage container comprising:

a first outer panel and a second outer panel;

the first outer panel having a first major surface and a second major surface;

the second outer panel having a first major surface and a second major surface;

the first major surface of the first outer panel facing the first major surface of the second outer panel;

first and second inner panels disposed between the first and second major outer panels;

the first and second outer major panels being fabricated from a paper-based material;

the first and second inner panels being fabricated from a paper-based material;

the first and second outer panels cooperating with the first and second inner panels to define a storage chamber adapted to receive the item of recorded media; and one of the first and second outer major panels defining a door integral to the panel; the door being movable from a closed position to an open position wherein the door is sized to allow an item of recorded media to be removed from the storage chamber when the door is in the open position;

the storage chamber being offset from the door causing a portion of the major outer panel that defines the door to cover a portion of the storage chamber when the door is in the open position.

10. The container of claim 9, further comprising a hinge panel connected to each of the first and second outer major panels.

11. The container of claim 10, wherein the first and second inner panels are connected together with a hinge.

12. The container of claim 9, wherein the door is defined by a perforated perimeter line that allows the door to be torn from the outer panel.

13. A media storage container for holding an item of recorded media, the media storage container comprising:

a first outer panel and a second outer panel;

the first outer panel having a first major surface and a second major surface;

the second outer panel having a first major surface and a second major surface, the first major surface of the first outer panel facing the first major surface of the second outer panel;

the first and second outer panels cooperating to define a storage chamber adapted to receive the item of recorded media:

a first inner panel disposed between the first and second major outer panels: the first inner panel defining a portion of the storage chamber;

one of the first and second outer major panels defining a door integral to the panel; the door being movable from a closed position to an open position wherein the door is sized to allow an item of recorded media to be removed from the storage chamber when the door is in the open position; and the door being offset from the storage chamber causing a portion of the major outer panel that defines the door to cover a portion of the storage chamber when the door is in the open position.

14. The container of claim 13, wherein the panels are fabricated from paperboard.

15. The container of claim 13, further comprising a second inner panel adjacent to the first inner panel; the second inner panel defining a portion of the storage chamber.

16. The container of claim 15, further comprising a hinge panel connected to each of the first and second outer major panels.

17. The container of claim 16, wherein the first and second inner panels are connected together with a hinge.

18. The container of claim 13, wherein the door is defined by a perforated perimeter line that allows the door to be torn from the outer panel.

* * * * *